(12) United States Patent
Motamedi et al.

(10) Patent No.: US 6,839,172 B1
(45) Date of Patent: Jan. 4, 2005

(54) ENHANCED SAMPLING RATE IN TIME DOMAIN IMAGING USING MOEMS SCANNING OPTICAL DELAY LINE

(76) Inventors: Manouchehr E. Motamedi, 756 Paseo De Leon, Newbury Park, CA (US) 92109; Ali E. Dabiri, 2230 Middleton Way, San Diego, CA (US) 92109

(*) Notice: Subject to any disclaimer, the term of this patent is extended or adjusted under 35 U.S.C. 154(b) by 0 days.

(21) Appl. No.: 10/713,171

(22) Filed: Nov. 15, 2003

(51) Int. Cl.$^7$ ................................................ G02B 5/18
(52) U.S. Cl. ........................... 359/571; 359/17; 359/223
(58) Field of Search ................... 359/17, 205, 223–224, 359/566, 571

(56) References Cited

U.S. PATENT DOCUMENTS

| | | | |
|---|---|---|---|
| 5,903,380 A | * 5/1999 | Motamedi et al. | 359/224 |
| 6,094,289 A | 7/2000 | Moranski et al. | |
| 6,111,645 A | * 8/2000 | Tearney et al. | 356/499 |
| 6,654,127 B2 | * 11/2003 | Everett et al. | 356/479 |

FOREIGN PATENT DOCUMENTS

| | | |
|---|---|---|
| EP | 875780 | 11/1998 |
| JP | 10325935 | 12/1998 |

OTHER PUBLICATIONS

C. Palmer, "Diffraction Gratings Handbook", 2002, Thermo RGL, p. 104.*

* cited by examiner

*Primary Examiner*—Leo Boutsikaris

(57) ABSTRACT

Electromagnetic waves in wide frequency ranges up to photonics have been used for applications to time-domain imaging (TDI). Realistic time domain imaging requires a rapid optical delay line on the order of 100 ps with sampling rate at least 100 Hz. Present available optical time delay systems suffer either from low sampling rate or low time delay length, deviating from ideal requirements. The purpose of this invention is to introduce a miniature and rapid scanning optical delay line based on micro-opto-electro-mechanical system (MOEMS) technology to improve the data acquisition in time domain imaging, capable of sampling rate beyond 100 Hz and time delays beyond the 100 ps.

9 Claims, 1 Drawing Sheet

ENHANCED SAMPLING RATE IN TIME DOMAIN IMAGING USING MOEMS SCANNING OPTICAL DELAY LINE

FIELD OF THE DISCLOSED METHOD & APPARATUS

This Method and apparatus is related to time domain imaging and more specifically related to MOEMS scanning optical delay line.

BACKGROUND

Electromagnetic waves in wide frequency ranges from microwave, terahertz, IR, to photonics have been used for applications to time-domain imaging (TDI). Time-domain imaging has potential to offer a solution in numerous applications ranging from medical diagnostics to security for package screening, color testing, and explosive detection. In spite of all these potential applications, time-domain imaging suffers for low sampling rate, which mainly is caused by the slow speed of its optical delay lines (ODL), which is a major component of TDI. In realistic time-domain imaging, an oscillatory optical time delay window of 100 ps at 100 Hz is required. Presently, such an ODL with this performance is not available. To arrange a time delay window of 100 ps, retro-refracting mirrors are used to oscillate with amplitude of 1.5 cm to generate 3 cm optical path difference (OPD) using an appropriate mechanical shaker at resonance mode. Even though this technique supplies the 100 ps required optical delay line, it suffers from a low scanning rate (less than 20 Hz).

In TDI, the 100 ps optical delay requirement exists when the system is used for deep depth spectroscopy and when the layers of sample in depth are under test. In some cases, the sample depth study is limited and much lower time delay of 100 ps is required, but the system speed is critical. In these situations, the shaker machine could be replaced by a piezoelectric driver, to improve scanning speed to a required level of 100 Hz. The piezoelectric system suffers from high voltage power supply requirement for operating piezoelectric circuits.

Therefore, the today's available ODL techniques, suffer from low sampling rate and make the imaging time sometimes to several minutes or even hours, or the systems are only applicable for TDI which requires a small time delay for operation. In studying numerous TDI applications, it is cleared that both system requirements of 100 ps time delay, and repetition rate of 100 Hz, are essential to perform simultaneously.

BRIEF SUMMARY

Electromagnetic waves in wide frequency ranges from microwave, terahertz, IR, to photonics have been used for applications to time-domain imaging. Time domain imaging requires an optical delay line capable of high-speed sampling (at least 100 Hz) and long enough time delay capacity on the order of 100 ps. The purpose of this invention is to introduce a miniature and rapid scanning optical delay line based on micro-opto-electro-mechanical system (MOEMS) technology to improve the data acquisition in time domain imaging for all applications requiring optical time delays up to or even beyond the 100 ps.

It was well known that the solution to optical scanning for many applications required high number of resolution light spots. This required a large-area scanner mirror. However, while scanners with large area mirrors are available now, they are built using bulk optics such as a galvanometric system or rotation of a mirror by a small motor. These scanning systems could have a large size mirror, but such systems are heavy, expensive, and unreliable.

DETAILED DESCRIPTION

Figure 1:
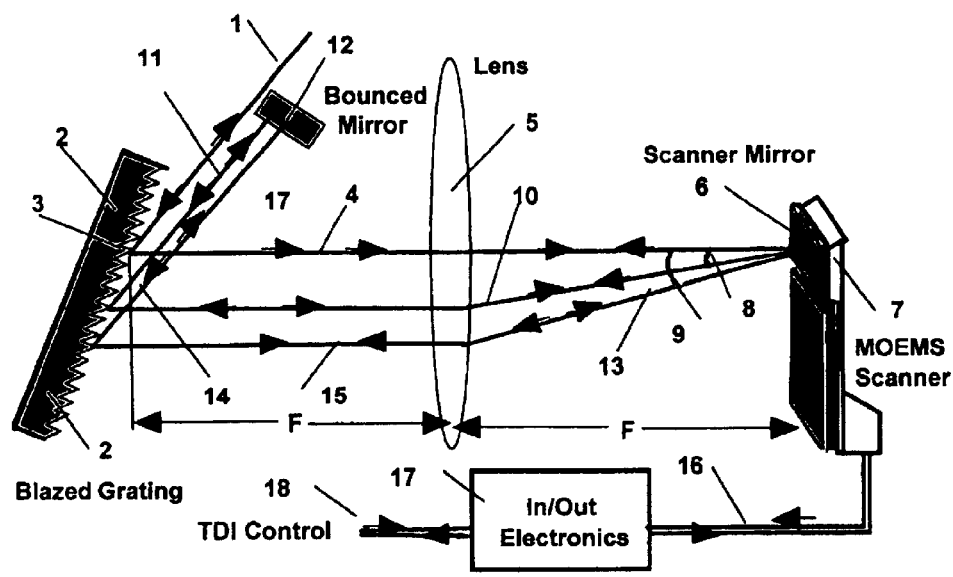
FIG. 1 is a schematic diagram of the miniature rapid scanning optical delay line in accordance with one embodiment of the disclosed method and apparatus.

The disclosed apparatus is a miniature and rapid scanning optical delay line based on micro-opto-electro-mechanical system (MOEMS) technology. MOEMS is a new advanced technology as described in the special issue of Optical Engineering Journal, in "Micro-opto-electro-mechanical systems", Optical Eng. Vol. 36, No. 5, May 1997. The disclosed apparatus improves the data acquisition in time domain imaging for all applications requiring time delays up to or even beyond the 100 ps and sampling rate of higher than 100 Hz.

The key to the disclosed method and apparatus is what we have achieved during the past several years in development of micro-optics and micro-electro-mechanics system (MEMS) and finally by merging these two advance technologies and creating a new worldwide used technology of MOEMS. The disclosed embodiment includes as a major component, an optical scanner that has been developed, tested, and which is in the process of being manufactured.

The development of presently disclosed MOEMS scanner is the result of several years R&D and commercial research and development (CR&D). MOEMS scanner used in the presently disclosed method is 100% reliable, low weight and practically low cost. The scanner also contributes tremendously to a total system size reduction. The presently disclosed scanner chip survived 20 billion cycles during eighteen months of device operation during environmental testing.

Operation of the scanner is described as follows. When an optical beam strikes a scanner mirror, the reflection from the mirror is a stationary circular beam observed on the target plane. The diameter of this beam is controlled by the distance of the target plane from the scanner and beam collimation performance. When no DC bias voltage is applied to the scanner terminal, the location of the beam on target plane is undefined. Application of DC bias voltage moves the beam downward and the circular beam will be relocated on the target plane. This relocated position is called pointing vector. When an AC voltage at the resonance frequency is applied, the circular beam will scan around the pointing vector and demonstrate a straight line of scan on the target plane. As this scan line more coincides to a true straight line, it demonstrates mirror flatness and absence of distortion. A variable optical delay line can be achieved by varying the amplitude of the AC voltage and keeping the frequency constant.

For clarity of explaining how the proposed system works, the focusing/collimating lens and grating are selected as off-the-shelf items, but they can be all processed by micro-optics or parts of the same chip (lab-on-chip). Lab on chip is a new technology based on MOEMS and it is in the process of development, as is indicated in the article entitled "Lab-on-Chip", Technical Proceedings of the 2003 Nanotechnology Conference and Trade Show, Volume 1, Chapter 6. The integration of micro-optics and micro-mechanics, two independent micro technologies compatible with IC processing, provides several orders of magnitudes size reduction and when used, plays important role in total system miniaturization. In one embodiment, the chip is CMOS compatible. Therefore, the presently disclosed scanning optical delay line can be fabricated with all feedback control systems to be batch processed in a single multifunction chip to help shrink the component size and support development of portable TDI systems.

The MOEM scanner chip used in this invention has an area of 9 mm×8 mm containing a 3 mm×3 mm flat mirror. The rest of the chip area is for microelectronic circuits controlling the scanner. The chip is a true sensor with control circuits either hybridized on package or is monolithically on the chip. In this case, the chip size may increase depending the size of the control circuits. However, in another embodiment, the scanner mirror is a large mirror (about 10 mm $^2$) based on IC fabrication. The mirror surface is flat to better than $\lambda/2$ and the wave reflection is not wavelength dependent. In one embodiment, the reflectivity is maximized by coating the mirror surface with a proper material of proper thickness as required by design values at operational radiation frequency. The presently disclosed scanning optical delay line demonstrate no dispersion and no distortion due to the surface flatness better than $\lambda/2$. Accordingly, the system does not require optical correctors and optical compensators during the construction of optical beam paths.

The MOEMS Scanner is a scanning system based on thermal actuator to produce an IC-based integrated scanner mirrors (ISM). Accordingly, scan actuation is by thermal forces and it works when a partial area of a cantilever beam is thermally excited. In this area of the beam, multi-layers of materials are deposited with different temperature coefficient of expansion where at least one layer has a temperature coefficient of expansion that has the reverse polarity of the others. Applications of several AC volts to the actuator, causes the cantilever beam to scan. The amplitude of scanning becomes amplified as the applied AC frequency reaches to the mechanical resonance frequency of the cantilever beam. The scanning beam of MOEMS scanner is about 20 $\mu$m thick and is capable of scan angle of more than 20°. It is visually hard to see the scan motion and hard to hear any vibration noise. The resulting optical scanning is a process of scanning a light beam of any wavelength of electromagnetic waves from microwave, terahertz, through photonics in a straight line without distortion and dispersion of the light beam. The scan frequency is the repetition rate of the scanning cycle in hertz. Scan frequency, in general, is the fundamental mechanical resonance frequency of the cantilever beam processed inside the chip by the method of IC processing. Higher scan frequencies could be achieved by exciting higher harmonics.

For clarity of describing the proposed method of invention, a simple achromatic lens for focusing and collimating the optical paths between grating and scanner mirror has been selected. For most of the spectrum covered in this invention, the lens requires special design. In fact, it is a quasi optics lens. As the frequency of electromagnetic radiation (microwave, terahertz, photonics including IR), is selected the material of the lens can be chosen and the lens can be processed in a kinoform shape with high efficiency as described in copending U.S. patent application Ser. No. 10/746,440, entitled "Efficient optics for terahertz imaging and sensing". The lens with kinoform shape, makes the presently disclosed scanning optical delay line highly efficient in diffractive optical processing and inherently supports an improvement in signal to noise ratio.

Again, for clarity of describing the proposed method, a simple blazed grating for beam diffraction has been chosen. For most of the spectrum covered in this disclosure, the grating structure also requires special design. In fact, it should be processed by MOEM techniques to micromachine the structure to be processed in a kinoform shape (for grating a saw tooth shape), which is also called blazed grating. Grating selected is preferably blazed at center frequency of TDI operation. The grating structure processed in this fashion folds diffraction orders on one side to increase the grating efficiency. A high efficient grating structure which folds the power of positive and negative diffraction orders together makes the presently disclosed scanning optical delay line more manageable during the construction of optical paths. It will be understood by those skilled in the art that the grating structure is designed based on system parameters, like radiation frequency, the size of scanning optical delay line, radiation beam dimensions, allowed dispersion, and selected lens performance. In accordance with one embodiment, the grating is formed by a microoptic technique which allows the presently disclosed scanning optical delay line to be designed using a variety of grating, including holographic grating which contributes to both efficiency and system miniaturization. In addition, high-speed data collection makes the scanning optical delay line applicable to realistic time domain imaging.

FIG. 1 shows a schematic diagram demonstrating 8 rapid scanning optical delay line using a presently available and patented MOEMS optical scanner. Optical delay line is a key component in time domain imaging (TDI). The reference beam 1 of time domain imaging is entering in our invention device, MOEMS rapid scanning optical delay line (MRSOD), as an incident beam and strikes grating 2 at the point 3 at a predetermined angle and is diffracted in the direction 4. The figure depicts the case of using a grating with a blaze selected to enhance the optical efficiency (i.e., the −1 order). The grating is designed for electromagnetic frequencies of operation. The structure of this grating such as physical dimension in mm and critical dimension (CD) in line/mm are selected based on the requirement of the time delay. Considering that the wavelength 1 of incident waves is known, the angle of incident is selected to force the beam 4 to have the maximum diffracted power in "−1 order". The diffracted beam 4 is incident on a lens 5, of focal length F placed at a distance F from the grating. The lens 5 can be a simple achromatic lens or a quasi optics focusing and collimating system based on electro magnetic domain of operation. The lens 5 focuses the diffracted beam on the scanner mirror 6 of MOEMS scanner 7 placed at a distance F from the lens 5. The focused beam, arrives at MOEMS scanner perpendicular to the scanner mirror surface at scan angle=zero.

At this stage, the optical path difference (OPD) is referenced to zero (time delay is zero). As the MOEMS scanner starts to scan, the figure shows three angular positions of the scanner mirror 6, normal incidence, at scan angle=0 and two other angles 8 and 9. The scan angle is the optical scan angle in degrees. The optical scan angle is twice of mechanical scan angle and it is the oscillation of the scan beam around the pointing vector. The scan angle is directly proportional to the amount of optical delay that system can achieve. The beam 10 reflected from the scanner mirror 6 is collimated by the lens 5 and diffracted from the grating back along a direction 11 parallel to the original incident beam 1 where it strikes on a bounced mirror 12. The bounce mirror 12 is preferably a stationary regular mirror coated for the maximum reflectivity at the center wavelength of TDI operation.

The beam is then retro-reflected from bounced mirror 12 such that it retraces its path back through the system in a reciprocal manner, and finally exits from the system along the path 1 where it entered.

Since the scanner mirror 6 continuously scans, the beam 13 is now reflected from the scanner mirror 6. Beam 13 is collimated again by the lens 5, arrives on a different location of the grating 2, and diffracted back from the grating 2 along the direction 14. Same process is performed to retrace beam 14 back through the path 15 where finally exits along the path 1. This process will continue until the scanner returns back to its original position where scan angle is zero and scanning cycle is completed. During the entire process in each scanning cycle and during the test operation, MOEMS scanner is receiving electrical power and control signals through connection 16 from "In/Out Control Electronics" 17. System 17 is fed by TDI control through connection 18.

The system performance for a time domain imaging for two different optical wavelengths, $\lambda=0.835\mu$ and $\lambda=1.5\mu$ which are widely used in many imaging applications have been calculated. We also include as system components a MOEMS scanner device, which is already developed and demonstrated for manufacturing. This device is the present state-of-art for an IC based miniature optical scanner with the following obtained manufacturing performances.

| | |
|---|---|
| Mirror area | 9 mm$^2$ |
| Scan angle | 22° |
| Scan frequency | 100–800 Hz |
| Low voltage operation | 8 volts |
| Potential integration | CMOS process compatible |
| Mirror flatness | Better than $\lambda/2$ |

Another component of the present invention is a blazed grating of typically 600 lines/mm. The rest of components of the present invention system are off-the-shelf items and can be selected as appropriate. We also select the distance between scanner and grating to be twice the focal lens of collimating lens and equal to 4 cm. This selection is based on development of a compact portable optical delay line.

To exhibit how the invention system works and demonstrate the system performance, a formula has been derived for calculation of optical path difference:

Optical path difference=$4\lambda F\phi/d \cos \theta_d$

Where $\lambda$ is the wavelength, F is the focal length of lens, $\phi$ is the scan angle, d is the grating groove spacing and $\theta_d$ is the diffraction angle. This formula is derived using the grating equations for the $-1$ order. Using above formulas, MRSOD generates about 100 ps optical delays for one complete cycle. This example demonstrates that we can offer maximum optical delay line requirement for all applications of time domain imaging via a reliable, rapid, and compact scanning optical delay line using MOEMS scanners. Higher order resonance makes the disclosed method and apparatus applicable to time domain imaging with scan frequencies as high as several KHz when the amount of required delay could be traded off against imaging speed.

What is claimed is:

1. A micro-opto-electromechanical systems (MOEMS) designed for a scanning optical delay line, including:

a) a grating;

b) a kinoform shaped microlens having a focal length of F and placed at a distance F from the grating;

c) a scanner mirror placed at a distance F from the lens and placed such that an incident wave traversing an incident path will be diffracted by the grating and directed through the microlens to strike the scanner mirror, the scanner mirror being controlled over a range of scanning angles; and d) a bounced mirror placed in a path parallel to an incident beam path;

wherein each of the components is fabricated using MOEMS technology to ensure the alignment between components wherein at least approximately 100 picosecond delays are delayed and scanner mirror is controllable to direct the diffracted beam to the scanner mirror to strike the bounced mirror retro-reflecting the beam from the bounced mirror such that the beam retraces its path back through the system in a reciprocal manner, finally exiting from the system along the path it entered.

2. The MOEMS of claim 1, wherein the grating has a blaze selected and fabricated using MOEMS technology to enhance optical efficiency.

3. The MOEM of claim 1, wherein the grating is designed for the particular electromagnetic frequencies of operation.

4. The MOEMS of claim 1, wherein the structure of the grating is selected based on the requirement imposed by a desired time delay.

5. The MOEMS of claim 4, wherein the structure of the grating includes a critical dimension in line/mm for integrated circuit fabrications.

6. The MOEMS of claim 1, wherein the wavelength $\lambda$ of the incident wave is known, and the angle of incidence is selected to force the beam to have a maximum diffracted power in "$-1$ order".

7. The MOEMS of claim 1, wherein the microlens has a focal length of F and is placed at a distance F from the grating.

8. The MOEMS of claim 1, wherein the loss microlens is fabricated using MOEMS technology.

9. The MOEMS of claim 1, wherein the optical components and associate controls comprise a (MOEMS) scanner, which enhances the scanning rate to several kilo Hertz.

* * * * *